(12) United States Patent
Weiksner et al.

(10) Patent No.: US 11,189,131 B1
(45) Date of Patent: Nov. 30, 2021

(54) SYSTEM AND METHOD FOR BLOCKCHAIN TOKENS FOR GAMING

(71) Applicant: Pocketful of Quarters, Inc., Riverside, CT (US)

(72) Inventors: George Michael Weiksner, Riverside, CT (US); George Bolden Weiksner, Riverside, CT (US); Timothy Ryan Tello, Trail Manor, TX (US)

(73) Assignee: Pocketful of Quarters, Inc., Riverside, CT (US)

( * ) Notice: Subject to any disclaimer, the term of this patent is extended or adjusted under 35 U.S.C. 154(b) by 0 days.

(21) Appl. No.: 17/195,732

(22) Filed: Mar. 9, 2021

Related U.S. Application Data

(60) Provisional application No. 63/055,974, filed on Jul. 24, 2020.

(51) Int. Cl.
| | |
|---|---|
| *G07F 17/32* | (2006.01) |
| *G06Q 20/40* | (2012.01) |
| *G06Q 20/36* | (2012.01) |
| *G06Q 20/38* | (2012.01) |
| *A63F 13/792* | (2014.01) |
| *A63F 13/35* | (2014.01) |
| *H04L 9/06* | (2006.01) |
| *G06F 21/10* | (2013.01) |
| *G06Q 30/02* | (2012.01) |

(52) U.S. Cl.
CPC .......... *G07F 17/3251* (2013.01); *A63F 13/35* (2014.09); *A63F 13/792* (2014.09); *G06F 21/10* (2013.01); *G06Q 20/3672* (2013.01); *G06Q 20/3674* (2013.01); *G06Q 20/383* (2013.01); *G06Q 20/4016* (2013.01); *H04L 9/0637* (2013.01); *G06Q 30/0271* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,704,344 B2 | 7/2017 | Luxton et al. | |
| 2019/0130698 A1* | 5/2019 | Simons | ............... G07F 17/3288 |
| 2020/0020032 A1* | 1/2020 | Bleznak | ............... G06Q 20/223 |
| 2021/0174641 A1* | 6/2021 | Simons | ................. H04L 9/3239 |

* cited by examiner

*Primary Examiner* — Ronald Laneau
(74) *Attorney, Agent, or Firm* — Graeser Associates International Inc; Dvorah Graeser

(57) ABSTRACT

A system and method for in-game tokens or specialized virtual currency which may be used for a variety of transactions, including within a plurality of games, yet for which transactions may be sufficiently controlled to avoid adverse real world effects. The system and method provide blockchain tokens for gaming, in which transactions related to such blockchain transactions are both controlled and flexible.

20 Claims, 15 Drawing Sheets

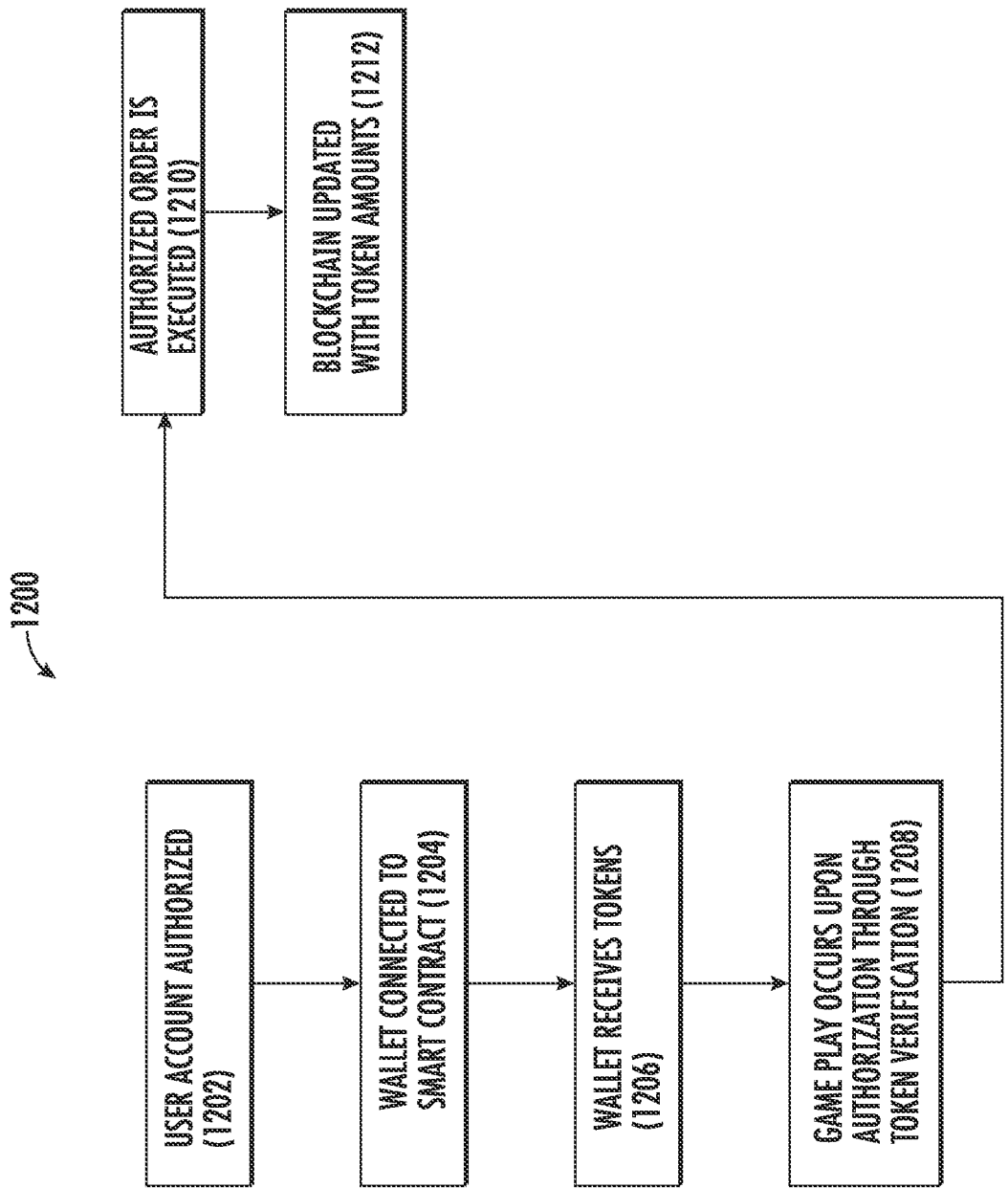

SYSTEM AND METHOD FOR BLOCKCHAIN TOKENS FOR GAMING

FIELD OF THE INVENTION

The present invention relates to a system and method for blockchain tokens or specialized virtual currency for gaming, and in particular, for such a system and method in which transactions related to such blockchain transactions are controlled.

BACKGROUND OF THE INVENTION

Blockchain technology may be applied in a variety of situations, for example to ensure transparency and traceability of transactions. Many cryptocurrencies such as Bitcoin are actually pseudonymous rather than anonymous, such that transactions are trackable according to a user identifier, such as a wallet identifier for example.

In other situations, control has been asserted through top-down, centralized measures, which significantly impact the ability of stakeholders to conduct transactions. For example, in many game systems, players (users) are only able to spend in-game tokens within that particular game. These restrictions can lead to significant frustration on the part of users and friction within game ecosystems. However, when such restrictions are removed, such that in-game money or tokens is exchangeable for real world fiat money, money laundering and other undesirable effects may result.

BRIEF SUMMARY OF THE INVENTION

The background art does not teach or suggest a system or method which both supports flexibility in transactions with in-game purchases and tokens, and yet is sufficiently controlled to avoid money laundering and other undesirable effects. The background art also does not teach or suggest a system or method which provides transparency for in-game purchases and tokens, and which also supports transactions within a wider game ecosystem.

The present invention overcomes these drawbacks of the background art by providing a system and method for in-game tokens or virtual currencies which may be used for a variety of transactions, including within a plurality of games, yet for which transactions may be sufficiently controlled to avoid adverse real world effects. The system and method provide blockchain tokens for gaming, in which transactions related to such blockchain transactions are both controlled and flexible.

By "gaming" it is meant any type of digital or online game or game play, including without limitation video games and games of chance, as well as gamified interfaces. By "token" it is meant any unit which has value in the gaming environment. Optionally, a token may also include any unit which has value for the receipt of prepaid services and rewards, including without limitation airline miles and prepaid credits. A "gaming ecosystem" preferably comprises a plurality of different games, optionally from one publisher or alternatively from a plurality of publishers. It is also referred to herein as a "micro economy". The gaming ecosystem may include individuals as publishers, as well as influencers, and tournament organizers and hosts. Such hosts may also include individuals, companies or organizations, who bring together groups of participants for gameplay or for watching such gameplay.

The plurality of different games may comprise games played across a plurality of platforms and/or on different gaming hardware. Optionally and preferably, token exchange is controlled through at least one smart contract, although connection to a central token exchange is not required.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions. The processor is configured to execute a predefined set of operations in response to receiving a corresponding instruction selected from a predefined native instruction set of codes.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, an iPad or other tablet, a game console, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 12 shows a non-limiting exemplary flow for operating the system of FIG. 11.

DESCRIPTION OF AT LEAST SOME EMBODIMENTS

Figure 1A:
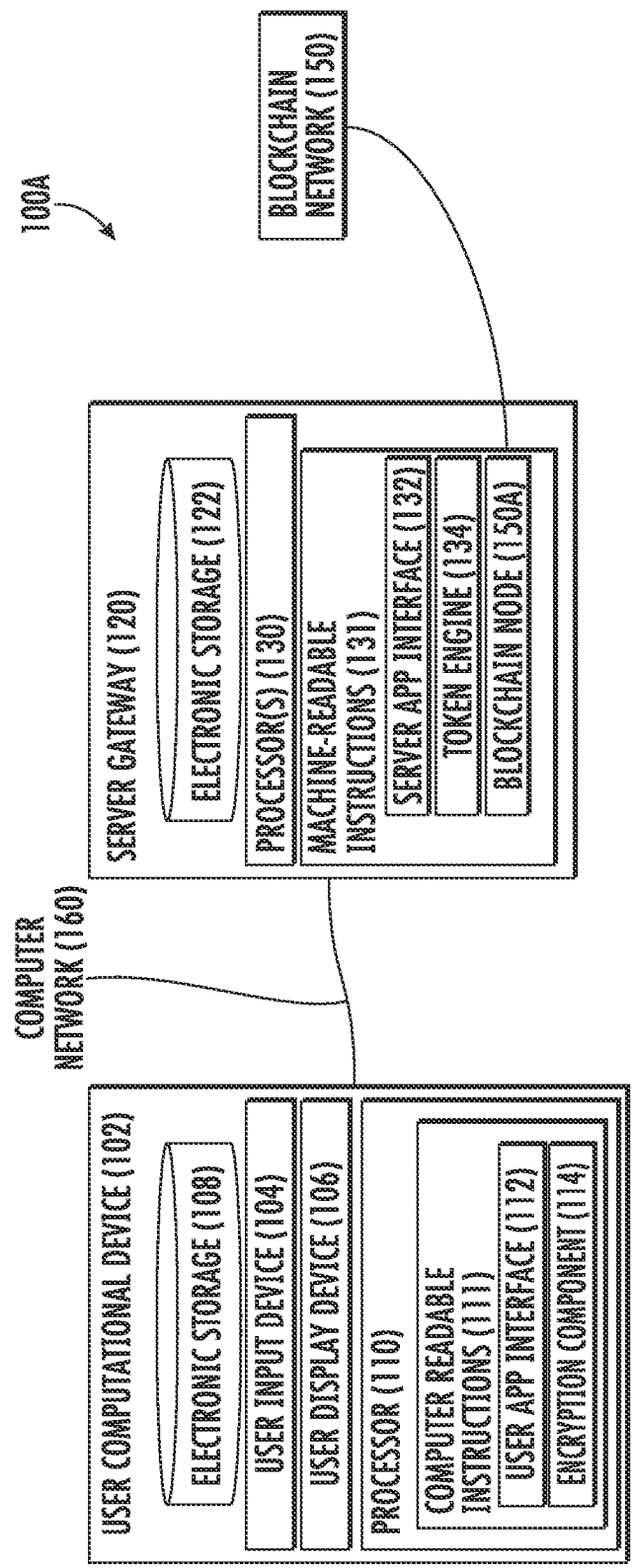
FIGS. 1A and 1B show non-limiting exemplary systems for recording game tokens for use with a game engine or a game server or app.

A blockchain is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin. The recorded data records on the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exist on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain.

In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably, the blockchain(s) that is/are implemented are capable of running code, to facilitate the use of smart contracts. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contracts may also be described as pre-written logic (computer code), stored and replicated on a distributed storage platform (e.g. a blockchain), executed/run by a network of computers (which may be the same ones running the blockchain), which can result in ledger updates (cryptocurrency payments, etc).

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Not all blockchains can execute all types of smart contracts. For example, Bitcoin cannot currently execute smart contracts. Sidechains, i.e. blockchains connected to Bitcoin's main blockchain could enable smart contract functionality: by having different blockchains running in parallel to Bitcoin, with an ability to jump value between Bitcoin's main chain and the side chains, side chains could be used to execute logic. Smart contracts that are supported by sidechains are contemplated as being included within the blockchain enabled smart contracts that are described below.

For all of these examples, security for the blockchain may optionally and preferably be provided through cryptography, such as public/private key, hash function or digital signature, as is known in the art.

As described herein, the term "token" may also include tokens, coins or NFTs (non-fungible tokens), or any digital asset for which at least title, and preferably provenance and chain of title, may be written to a blockchain.

Figure 1B:
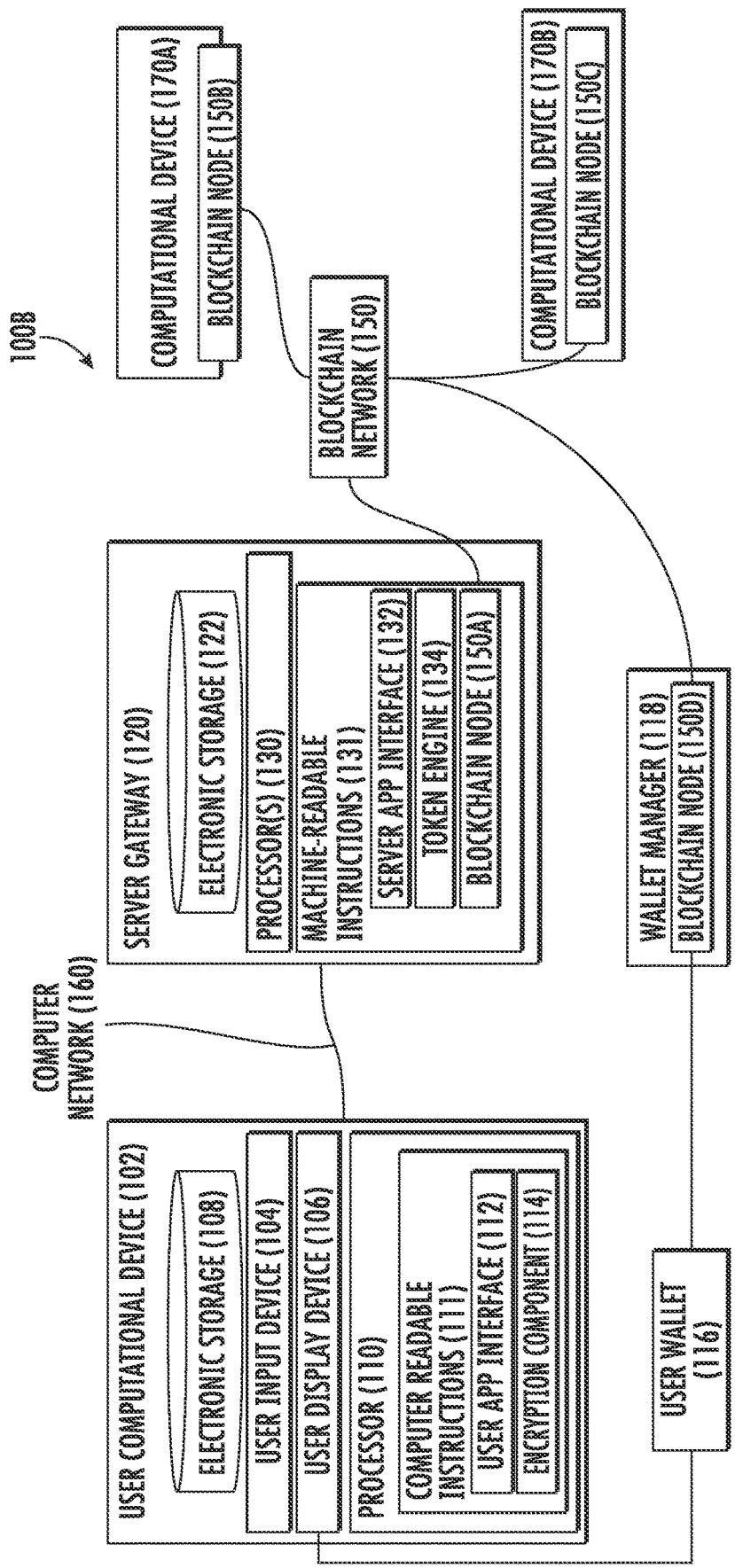

FIGS. 1A and 1B show non-limiting exemplary systems for recording game tokens for use with a game engine or a game server or app. As shown with regard to FIG. 1A, there is provided an exemplary non-limiting system for recording tokens on the blockchain for use with various types of games across multiple game servers or multiple game types. As shown with regard to system 100A, there is provided a user computational device 102, which communicates through a computer network 160 with the server gateway 120. User computational device 102 features a user app interface 112. User computational device 102 also optionally features an encryption component 114, which may be used to assist with reading information from already encrypted information to the blockchain, or may otherwise be used to provide an extra layer of security for user app interface 112.

User computational device 102 preferably also includes the user input device 104, and user display device 106. The user input device 104 may optionally be any type of suitable input device including but not limited to a keyboard, microphone, mouse, or other pointing device and the like. Preferably user input device 104 includes a list, a microphone and a keyboard, mouse, or keyboard mouse combination. User display device 106 is able to display information to the user for example from user app interface 112.

User computational device 102 also comprises a processor 110 and a memory containing computer readable instructions 111. Functions of processor 110 preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 111 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 111 is configured for storing a defined native instruction set of codes. Processor 110 is configured to perform a defined set of basic operations in response to receiving a corresponding basic instruction selected from the defined native instruction set of codes stored in memory 111. For example and without limitation, memory 111 may store a first set of machine codes selected from the native instruction set for receiving information from the user through user app interface 112 and a second set of machine codes selected from the native instruction set for transmitting such information to server gateway 120 for token exchanges, for example for use in gameplay.

User computational device 102 also comprises electronic storage 108. Electronic storage 108 may comprise non-transitory storage media that electronically stores information. The electronic storage media of electronic storage 108 may include one or both of system storage that is provided integrally (i.e., substantially non-removable) with user computational device 102 and/or removable storage that is removably connectable to user computational device 102 via, for example, a port (e.g., a USB port, a firewire port, etc.) or a drive (e.g., a disk drive, etc.). Electronic storage 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 108 may include one or more virtual storage resources (e.g., cloud storage, a virtual private network, and/or other virtual storage resources). Electronic storage 108 may store software algorithms, information determined by processor(s) 110, information received from server gateway 120, and/or other information that enables user computational device 102 to function as described herein.

Server gateway 120 features a token engine 134 for writing token information to or reading token information from blockchain node 150A. Blockchain node 150A is for example part of a blockchain network 150.

Token engine 134 may, for example, be used to determine the number of tokens a user has before gameplay starts to assist in the spending of, or acquisition of game tokens during game play and otherwise to write information, to read information from blockchain network 150, which includes a ledger accounting of the available tokens for the user and the state of changes in the availability of such tokens, for example during gameplay.

Server gateway 120 preferably comprises a processor 130 and a memory with machine readable instructions 131, with related or at least similar functions to the processor and memory described above, including without limitation functions of server 106 as described herein. For example and without limitation, memory 131 may store a first set of machine codes selected from the native instruction set for receiving token exchange instructions from user computational device 102 via a server app interface 132, and a second set of machine codes selected from the native instruction set for executing such token exchanges, for example for use in gameplay, which may be performed through token engine 134.

Server gateway 120 also comprises electronic storage 122. Electronic storage 122 may comprise non-transitory storage media that electronically stores information. The electronic storage media of electronic storage 122 may include one or both of system storage that is provided integrally (i.e., substantially non-removable) with server gateway 120 and/or removable storage that is removably connectable to server gateway 120 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 130, information received from user computational device 102, information received from blockchain network 150, and/or other information that enables server gateway 120 to function as described herein.

FIG. 1B shows a non-limiting exemplary system, which now also features a user wallet. Components with the same reference number as for FIG. 1A have the same or similar function. As shown in the system 100B, again user computational device 102 is featured, but user computational device 102 is now communicating with the user wallet 116. User wallet 116 may be operated by user computational device 102, but may also be operated by a different server. It may, for example, be operated by a different computational device and also may be managed by a wallet manager 118. Wallet manager 118 may read from, or write to a blockchain node 150D, which again is part of blockchain network 150. Although as described below, user wallet 116 may only be created after the associated user has been authorized, the identity of the user may be concealed to game publishers and/or developers, or those accessing server gateway 120. This pseudonymous identification after initial verification supports COPPA (Children's Online Privacy Protection Act) compliance, as no personal information of the user is stored.

COPPA compliance in video games is a significant problem for publishers and others who seek to monetize video games and other digital or online games. Such compliance now requires adherence to new compliance rules and regulations, which have increased the difficulty for game developers and publishers in regard to data collection from and/or marketing to their users. However, the above described system may be configured to collect no private information, as the player associated with user wallet 116. Gameplay information may then be connected to activities with user wallet 116, for example by assigning a hash. Marketing may then be directed to user display device 106 as associated with user wallet 116, without identifying the user, according to played games and the use of coins across the blockchain.

In this non-limiting example, a plurality of separate computational devices are provided, each of which computational devices 170A and 170B has a blockchain node 150B or 150C. In this non-limiting example, token engine 134 may communicate directly with a game engine or a game server, which is not shown, in order to assist the user in having tokens be made available to the user during gameplay. Optionally user wallet 116 also communicates directly with the game server, which is not shown, again in order to permit the user to take tokens that are associated with the user wallet 116 and then be able to spend them during game play with the game server. User wallet 116 may store a key for accessing same or alternatively, may store the plurality of tokens, directly or indirectly (for example by storing information required to access the tokens).

The above system, with controlled tokens and token transactions, may be used for fraud prevention. Currently for digital games and in particular mobile games, fraud and chargebacks are a costly expense to many games and publishers. Server gateway 120 and/or the game server may track transactions through user wallet 116 and reverse fraudulent transactions, and/or remove, reallocate, reward, and return coins purchased or fraudulently obtained for association with user wallet 116.

Figure 2A:
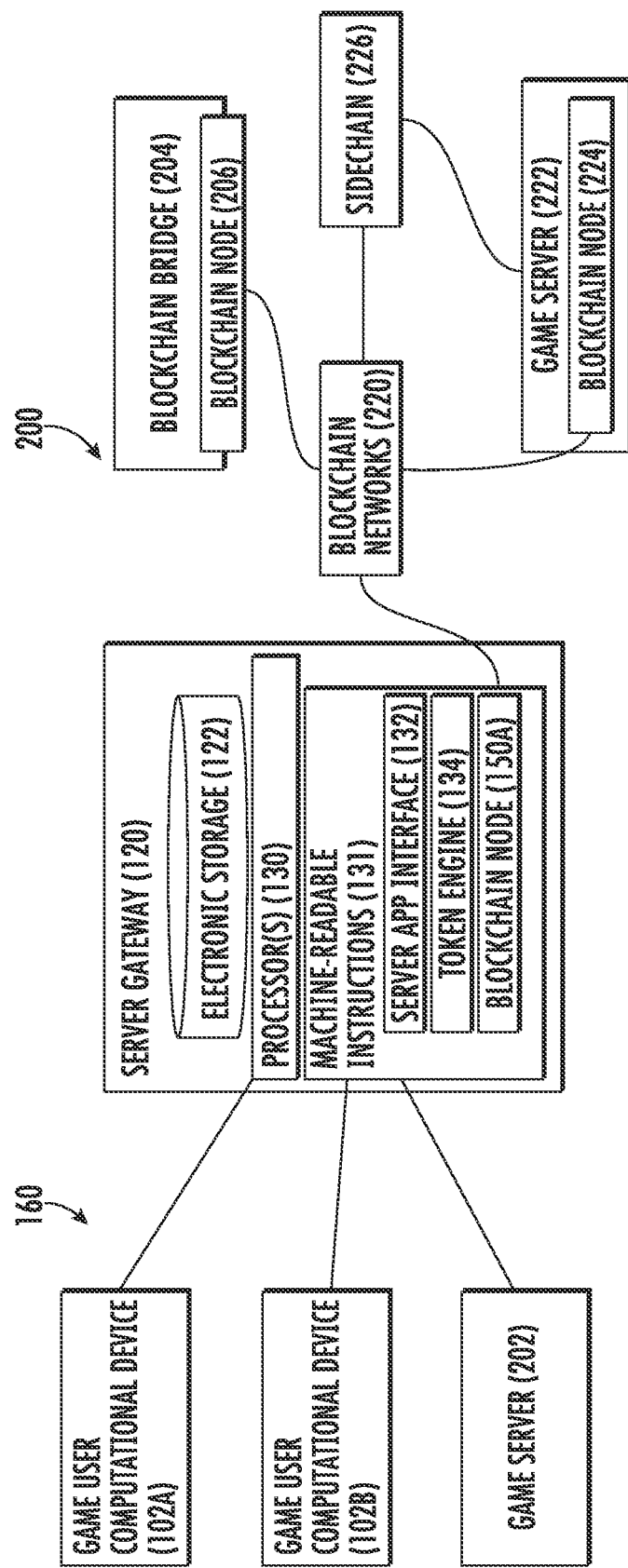
FIGS. 2A and 2B show non-limiting exemplary versions of a system with game tokens to be read from or written to a blockchain, but now also a game server is shown.
Figure 2B:
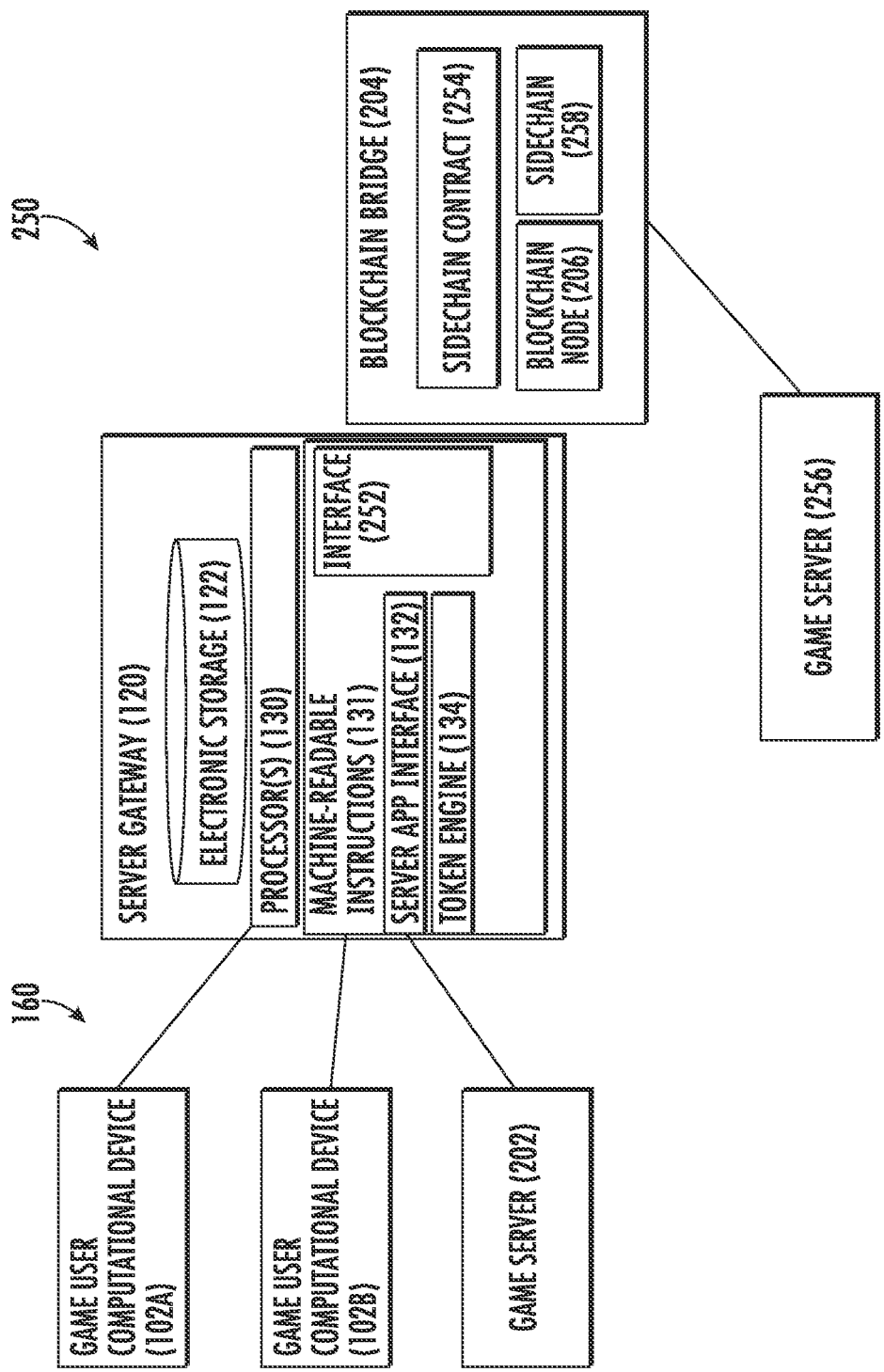

FIGS. 2A and 2B show non-limiting exemplary versions of a system with game tokens to be read from or written to a blockchain, but now also a game server is shown. FIG. 2A shows a non-limiting exemplary system 200, again featuring a plurality of game user computational devices 102A and 102B, which may be used to play games. Again, components with the same reference numbers have the same or similar function. However, in this non-limiting example, the token engine 134 is now able to communicate directly with a game server 202, for example to assist the game player in having tokens being read from or written to the game. As a non-limiting example, one reason why this could occur, may be for example, to permit the user to spend game tokens to be able to access the game or to be able to obtain game tokens from successful game play. Rewarding the user during successful game play with game tokens is one way to keep the user interested and may therefore be of interest to the game developer.

However, the game developer may also choose to give tokens as a reward. For example, if one user through, let's say for example a game user computational device 102A, were to cause another user to sign up for the game, then game user computational device 102A optionally with its associated wallet, which is not shown, could be rewarded with additional tokens by the game developer in order to encourage others to play the game. Server gateway 120 in some cases may serve as the gatekeeper for determining which tokens have been used, how many tokens are available for use, and also which tokens the user has been rewarded with at the end of each session, for example through a session with game server 202, which would otherwise have regular gameplay without reference to the tokens option.

If the user does not have sufficient tokens, the user may be blocked from playing a game through game server 202. The user could also choose through, for example, a game user computational device 102A or 102B, to purchase tokens, but also to purchase items with tokens, such as for example, without limitation schemes, extra lives, new characters, the ability perhaps to command additional non-player characters and PCs and the like. In this non-limiting example, a blockchain network 220 may act, for example, as a bridge or may be connected to additional blockchain networks through a blockchain bridge 204. Blockchain bridge 204 may read from, or write to a blockchain node 206, which is part of blockchain network 220.

In this non-limiting example, token engine 134 may also write to a sidechain 226, for example through a blockchain network 220, which may for example, operate a smart contract, which is not shown. Game server 222 in this non-limiting example has a blockchain node 224, and so in this case may be able to write to sidechain 226 directly, or may be able to interact directly with token engine 134. Also optionally, blockchain node 150A is not present at server gateway 120 and instead, everything is handled through these external interfaces which support blockchain interactions such as reading from the blockchain or writing to the blockchain.

FIG. 2B shows a non-limiting exemplary system 250. Again, components with the same reference numbers have the same or similar function. In this non-limiting example, the sidechain and blockchain interactions have been changed. As previously described as an optional implementation, server gateway 120 no longer has an associated blockchain node, and so can no longer read from or write to a blockchain node directly. Instead through interface 252, server gateway 120 interacts indirectly with the blockchain bridge 204. Blockchain bridge 204 may, for example, enable the user to interact with a sidechain support contract 254, which enables sidechain management. Sidechain support contract 254 enables interactions and transactions to be read from or written to sidechain 258. Again, sidechain support contract 254 may also write such interactions to blockchain node 206, for example to permit final accounting, to take place on the blockchain node 206 directly, as opposed to the sidechain 258. For sidechain support contract 254 may cause final state of win/loss to be written to the blockchain. Server gateway 120 and potentially game server 202 or 256 can interact with the sidechain 258 during game play; after the game is over, then any of server gateway 120, game server 202 or 256, may then write to the blockchain. Blockchain bridge 204 could interact with the sidechain 258, but preferably does so through sidechain support contract 254. Through sidechain support contract 254, for example according to instructions sent to server gateway 120 from a respective game user computational device 102A or 102B, a user can delegate an amount of tokens that the game server 202 or 256 may have access to without an additional confirmation, to prevent requiring a permission dialog in the middle of gameplay. Optionally in the future, players can interact with the sidechain directly (or with the blockchain).

Sidechain support contract 254 may be implemented in a plurality of different ways, including without limitation as a plasma contract (sometimes referred to as a "plasma bridge") and/or as a PoS (Proof of Stake) bridge. A bridge comprises one or more smart contracts that are able to move assets from the root chain to the child (or side) chain, and then back. Both the PoS Bridge and the plasma bridge implementations are described in this reference on the Matic Network, provided as a non-limiting example only: https://docs.matic.network/docs/develop/ethereum-matic/pos/getting-started/.

In this non-limiting example, for example, game user computational device 102A or 102B may be caused by the user to start gameplay, either with game server 202, which relies on server gateway 120, or game server 256, which interacts directly with blockchain bridge 204. The user would access their tokens to be able to start gameplay, continue gameplay, or perhaps they may choose to purchase extras during game plays such as those that are previously described.

In this non-limiting example, either game server 202 or game server 256 could then communicate with blockchain bridge 204, either directly or through server gateway 120, to request that a certain number of tokens be moved from the blockchain to sidechain 258. This movement to sidechain 258 is for speed of transaction so that the user would not need to authorize each separate spend of tokens, but could instead authorize an initial amount of tokens to be spent during gameplay and then could perhaps reauthorize later on so that the user can meter the amount of tokens they're using. Furthermore, if the user wins game tokens or is rewarded with them for whatever reason, by either game server 202 or 256, then this information may be temporarily written to the sidechain 258, but then through sidechain support contract 254, may be written to blockchain node 206 for a final accounting.

One way that this could occur, may be for example, as can be done at a casino with physical chips or with virtual chips, a player would enter the casino. They would exchange a certain amount of currency. In this case, could be fiat currency or cryptocurrency, for a certain number of chips, in this case tokens. These would then be spent by the player at various games available at the casino. And at the end, the user would bring back whatever chips they had left and they could convert them back to some kind of monetary value, which in this case would be either again, fiat currency or cryptocurrency. Optionally, however, sidechain support contract 254, blockchain bridge 204 or token engine 134 could actually limit the extent to which exchanges can be made.

For example, perhaps a user could select the option of buying a game virtual currency or other tokens, but might not be able to convert them back to fiat currency. This restriction for example, could be used to prevent money laundering, gambling and other undesirable activities during gameplay. Actually, the same tokens are available for a plurality of different games. For example, in this system, the user could conceivably use the same tokens through game server 202 and game server 256, or for a variety of different games and would not necessarily need to be limited to only one game. This greater usability would allow the user to get more value out of their tokens and therefore potentially to appreciate them more to provide a better solution from the point of view of the user. The restrictions may be implemented for example according to the type of account of the token holder, which may also relate to the ability of the account to receive a token for example.

Optionally, all transactions are handled on sidechain 258, without reference to a parent blockchain.

Figure 3:
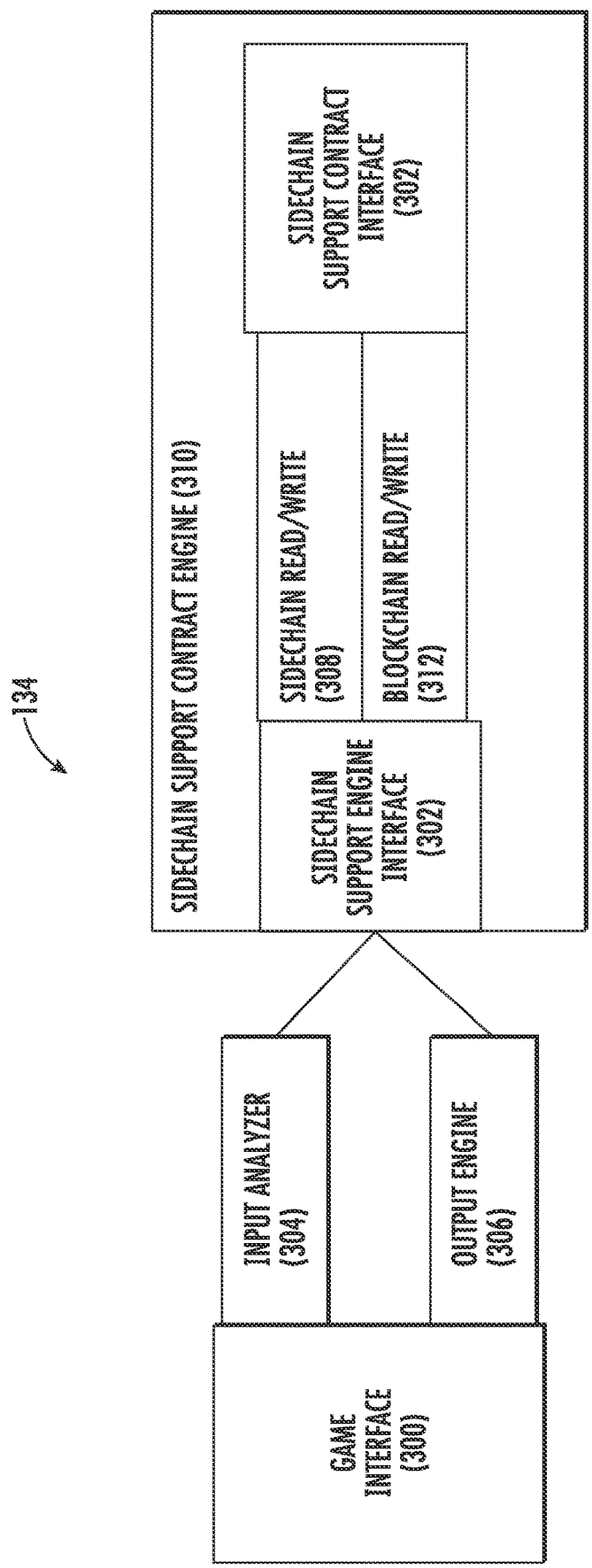
FIG. 3 shows a non-limiting exemplary token engine.

FIG. 3 shows a non-limiting exemplary token engine 134, which was shown in the previous figures. In this non-limiting example, token engine 134 features a game interface 300, which is connected to an input analyzer 304. Information that is received by token engine 134 is fed to input analyzer 304. From there, the information goes to sidechain support contract engine 310. Sidechain support contract engine 310 handles all of the contract activities with the sidechain and optionally, also with the blockchain. This allows the user to enjoy the use of tokens during game play and to have the amount of tokens owned by the user before, during, and after gameplay to be monitored and to be determined, for example, to make certain that this user does not spend tokens that the user does not actually own.

Each command may come in from the game through game interface 300 to input analyzer 304. Then at sidechain support contract engine 310, a sidechain support engine interface 302 reads the interactions that have come in and then decides whether a read or write should occur at the sidechain. For example, a sidechain read and write 308 function may be invoked or a blockchain read and write function 312 may also be invoked to read from or write to the blockchain. In either case a sidechain support contract interface 302 preferably receives the command and then is able to determine what kind of command should be performed, how should the sidechain support contract be invoked, what kinds of information should be read from or written to and so forth. Then an output is provided, again coming from the read from or write to command. An acknowledgement or other type of output is provided from sidechain support contract engine 310 to output engine 306, which then provides it back to game engine 300. From there, the information leaves token engine 134 and returns back to the game server for use in game play, for beginning play, or for ending game play.

Figure 4:
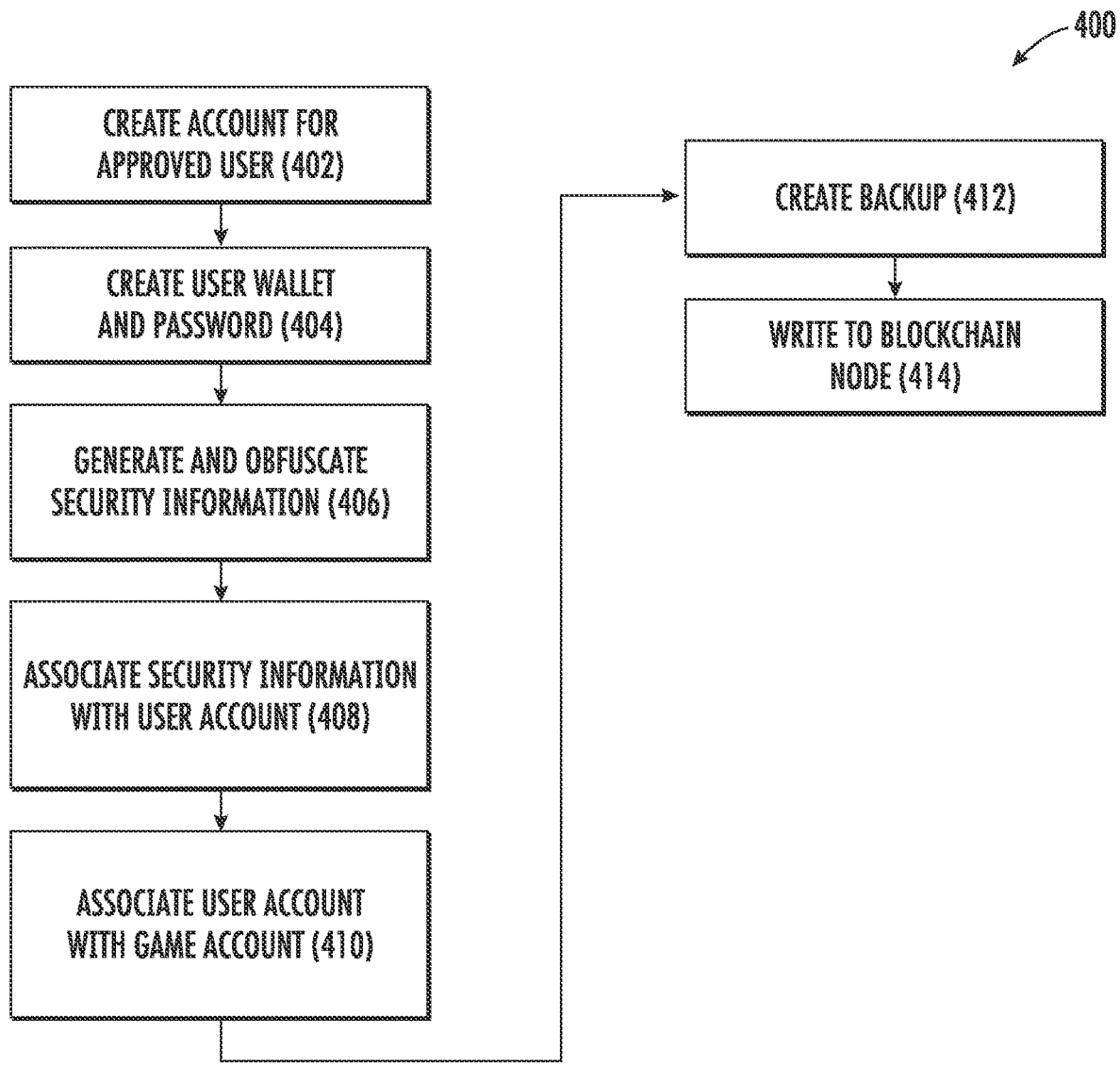
FIG. 4 shows a non-limiting exemplary method for basic wallet use and creation.

FIG. 4 shows a non-limiting exemplary method for basic wallet use and creation. Of course, other methods are also possible. This is only a non-limiting example. As shown in a method 400, an account is created for an approved user at 402. This may be used for example, to prevent money laundering. The user may be required to show some sort of user ID, as proof of age to avoid children signing up for the service or for using the service. The user ID may also be used to require some sort of proof of location of the user so that the user's ID matches the location where the user lives or is currently present, again to prevent fraud.

Next, a user wallet and password is created at 404, assuming that the account was successfully created. Then the security information is generated and obfuscated in 406. For example, the security information may include a seed password, some type of information which is used to associate the user with the user wallet and to allow the user to access the user wallet. In this case, the user wallet is preferably a hot wallet, meaning it is stored online. In some cases for added security, cold wallets are used and could conceivably be included within the present dimension, but in this non-limiting example, the user wallet is assumed to be a hot wallet and the security information is used to allow the user to only access this particular hot wallet to prevent unauthorized transactions.

Next, the security information is associated with the user account at 408, again, to permit the user through the user account to access the user wallet. Then the user account is associated with the game account at 410. It is possible for the user account and the game account to be one and the same, but if they are not, then the user account for the wallet needs to be associated with the game account. When the user starts to play a game, the user's hot wallet is automatically connected to the game account for game play. It is possible that the user account is associated with more than one game account at 410. For example, these users could play a variety of games with one hot wallet, while being able to access a plurality of different games and being able to spend and receive tokens in each of these games according to the token rules. The hot wallet may be used to connect to a game where only certain tokens associated with that wallet would be accessible for use in that game. Optionally a user may receive marketing or other information from game publishers or developers, based on gameplay as demonstrated through token use through the hot wallet, but without identifying the actual user.

Next, the backup is preferably created at 412. This is in case of unauthorized use, or in case some sort of access or recovery phrase is required, and the user forgets it. The backup may be online or it may be possible to create an offline backup or backup that would require more stringent access. The information that is necessary for the user to access and use the hot wallet is written to the blockchain note at 414.

Figure 5:
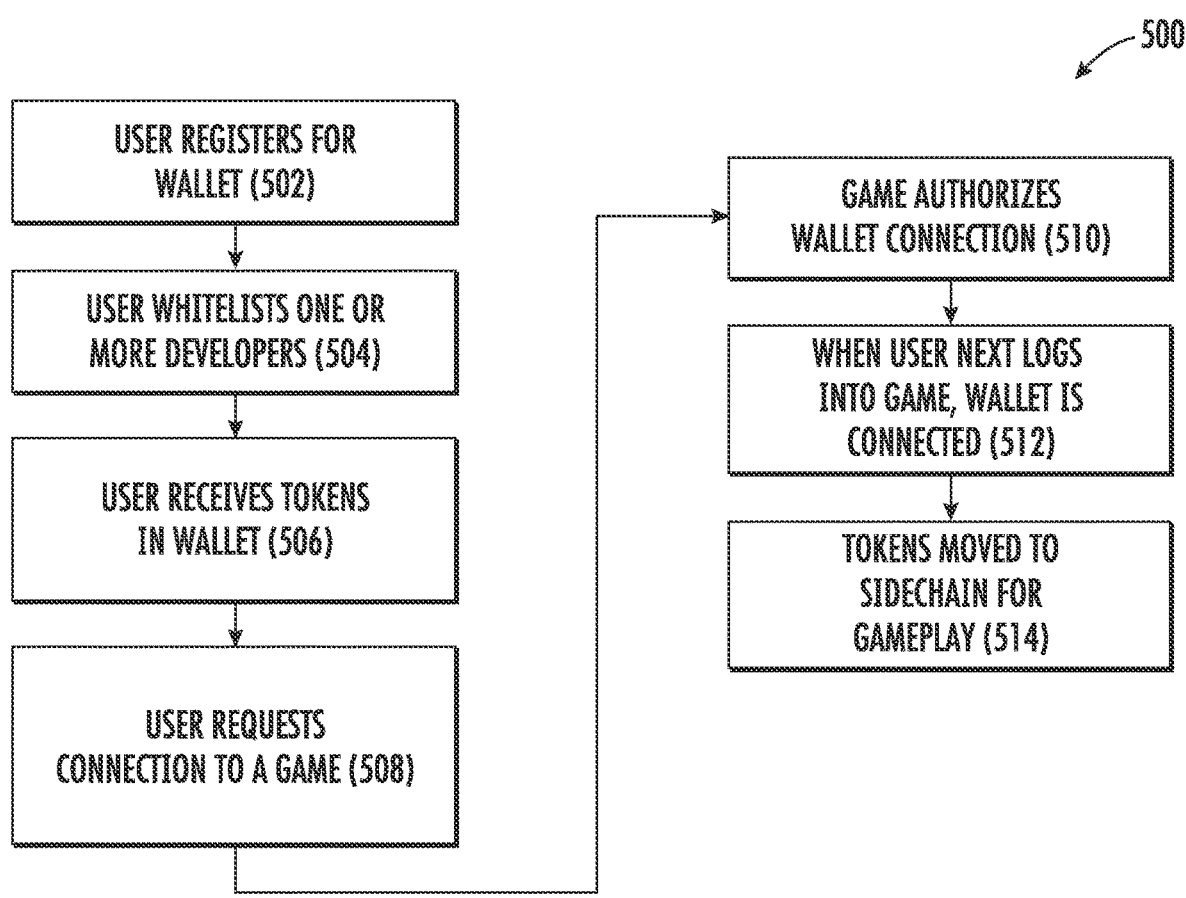
FIG. 5 shows a non-limiting exemplary method for connecting a wallet from the point of view of the user process to one or more games.

FIG. 5 shows a non-limiting exemplary method for connecting a wallet from the point of view of the user process to one or more games. As shown in method 500, the user first registers for the 502. Again, this assumes that the user has been authorized and that the user has a user account. Optionally, the user account and the wallet are themselves combined into a single process and a single account.

Next, the user white lists one or more developers on which they wish to spend game tokens at 504. For example, perhaps the user is very interested in games published by a particular independent developer or perhaps a particular publisher such as Disney, but does not wish to provide or allow access to the tokens to other publishers or developers. This may occur for a variety of reasons, lack of interest by the user. As another non-limiting example, perhaps a parent wishes to limit the games on which the child may choose to spend game tokens through the game wallet. The white listing process may be separate from the user wallet access process to allow for parental control, for example.

The user then receives tokens through user's hot wallet at 506, and then the user requests connection to a game at 508. It is possible for game connections to be provided automatically. For example, if a particular game developer or publisher wished to promote the use of the hot wallet, they could send an invitation to a user who was already playing the game and invite them to the hot wallet. In this case, there may automatically be connection to a game, but for future games or for situations where the user is signing up without such a direct connection being already made, the user would preferably request connection to a game at 508. The game would authorize the wallet connection at 510. Again, this may be due to restrictions based on location, restrictions based on identity of the user, for example, with regard to age or other reasons; this step is optional.

Optionally, a game may permit any and all connections that are made through the wallet, but if not, the game may require authorization, or may prefer to authorize wallet connections. Then, assuming the wallet connection is approved or otherwise occurs, when the user next logs into the game, the wallet is connected at 512. This is preferred so that the user does not need to each time reestablish a connection. The user may choose to temporarily establish a connection, which may be a one time connection, and may be a time limited connection. Similarly, the game may authorize only a one time connection or a time limited connection, for example, to encourage the user to play a new game or for a variety of other reasons, for example, for a tournament or other timed limited event. However, otherwise preferably the wallet connections to the game are stable and persistent and are retained over a plurality of gameplay sessions so that when the user would next log into the game, after the connection, the wallet has already connected. And the user can then choose to move tokens to the sidechain for gameplay at 514. This may occur automatically. The user may say that for this particular game, publisher developer or for all games or however the user wishes to make the connection, that a certain number of tokens may be automatically moved to the sidechain upon logging in.

The user may require, or the game may require, that the user specifies the number of tokens to be moved from the sidechain to the wallet each time for gameplay. Optionally tokens are stored on the sidechain. In that case, perhaps this step is not needed or optionally a sidechain is not present. In which case tokens are stored on the blockchain and access is made directly there.

In that case, similar rules and regulations and a similar flow may be performed. But in this case, it may be performed directly with the blockchain. Optionally, certain types of transactions are directional. For example, the user may choose to move tokens to a sidechain, then spend some tokens in the game and then move the remainder back.

In some cases, the user may choose to purchase new tokens with fiat or cryptocurrency. Optionally that is unidirectional so that the user cannot then move the game tokens back into fiat or cryptocurrency. Although, alternatively, they may be permitted to do so, but perhaps only up to a certain amount, only under certain conditions, or for example, they may also require additional authorizations from the user.

If the user is engaging in gameplay, but the user is also a developer who is receiving payment for developing skins or tools or entire games, then possibly the user would, for interactions paid for by other gameplay users, could receive payment back. But this user may still be restricted in what they can do with their own tokens as a gameplay user.

Figure 6:
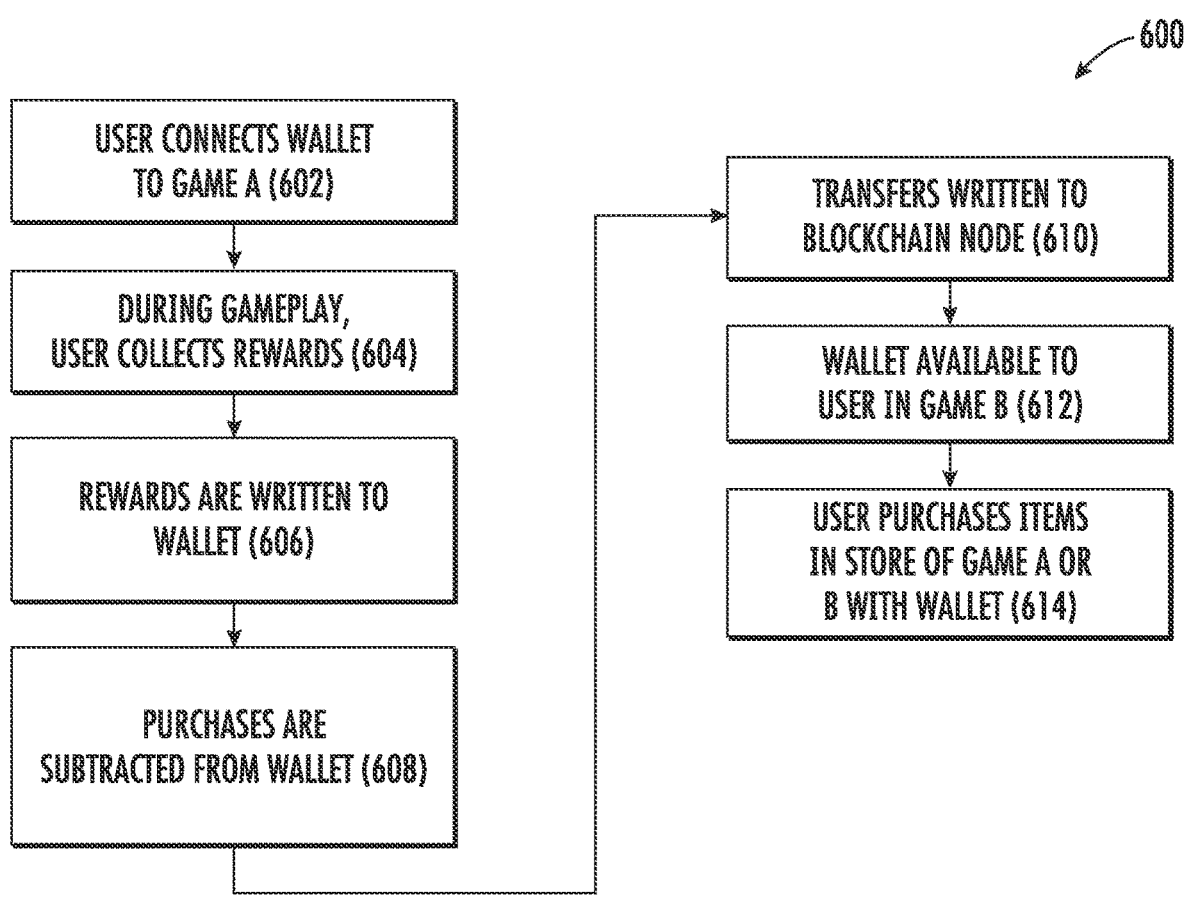
FIG. 6 shows a non-limiting exemplary flow for use of tokens in the game.

FIG. 6 shows a non-limiting exemplary flow for use of tokens in the game. In a flow 600, the user connects the wallet to game A at 602 if this has not already occurred. If the user wishes to start gameplay and the game is available for connection to the wallet, then a reminder may pop up and may ask the user if they wish to connect the wallet to the game.

Optionally the interface for moving tokens, for association with the wallet or alternatively for being accessed for gameplay, may be embedded from or accessed through the interface for game A. Alternatively, the user may be requested to go to a separate wallet interface, for example, as handled and provided by a separate wallet manager, which may be a separate computational device.

During gameplay the user collects rewards at 604. For example, for achieving game goals or for interacting with other users or however the game is structured. The user may also collect rewards simply for playing the game for a certain period of time.

The rewards are then written to the wallet at 606, in the sense that they are associated with the wallet. Optionally they're written only at the end of game play. They may be temporarily stored in a sidechain or in another storage and then only moved to the wallet at the end of gameplay. Purchases are then subtracted from the wallet at 608. Again, this may be performed through the sidechain, but the user tokens may be accessed through the wallet through the sidechain directly or through the blockchain directly.

Preferably the sidechain versus blockchain designation, in terms of where exactly the tokens are, is hidden from the user. In some cases, the user may prefer to know where the tokens are being stored. But the user wallet preferably provides a seamless interface with the user does not need to directly consider the differences or the challenges involved in interactions between sidechain of blockchain for user token accounting.

Any written changes are preferably transferred to the blockchain node at 610, either periodically during the game or at the end of game play. The wallet may also be available to the user in game B at 612 once the user pauses or stops game A. If the user purchases items in the store of game A or game B with the wallet 614. Optionally the same tokens may be used but this is not necessary. Alternatively different tokens may be used.

For example, if game A gives the user a token as a reward for spending many hours playing the game, introducing other users to the game, promoting the game on social media or through other methods. These reward tokens may only be spendable in game A and they may not be spendable in game B. On the other hand tokens that the user purchases may be accessible and available for use in both games A and B.

Preferably the wallet clarifies the situation to the user by showing a variety of different tokens and for which games these tokens are available. In terms of the gameplay view, the user may choose to see for each game that they want to play a summary of all of the tokens that are available and the state of their use. This may be particularly interesting for the user, for example, if the tokens will expire after a certain period of time.

If that is the case, preferably these tokens are emphasized to the user to encourage the user to spend them before they expire. Time limited tokens may be used for a variety of reasons, when games change versions, when the user receives reward and the game publisher developer wishes that reward to be spent quickly and forth.

Figure 7:
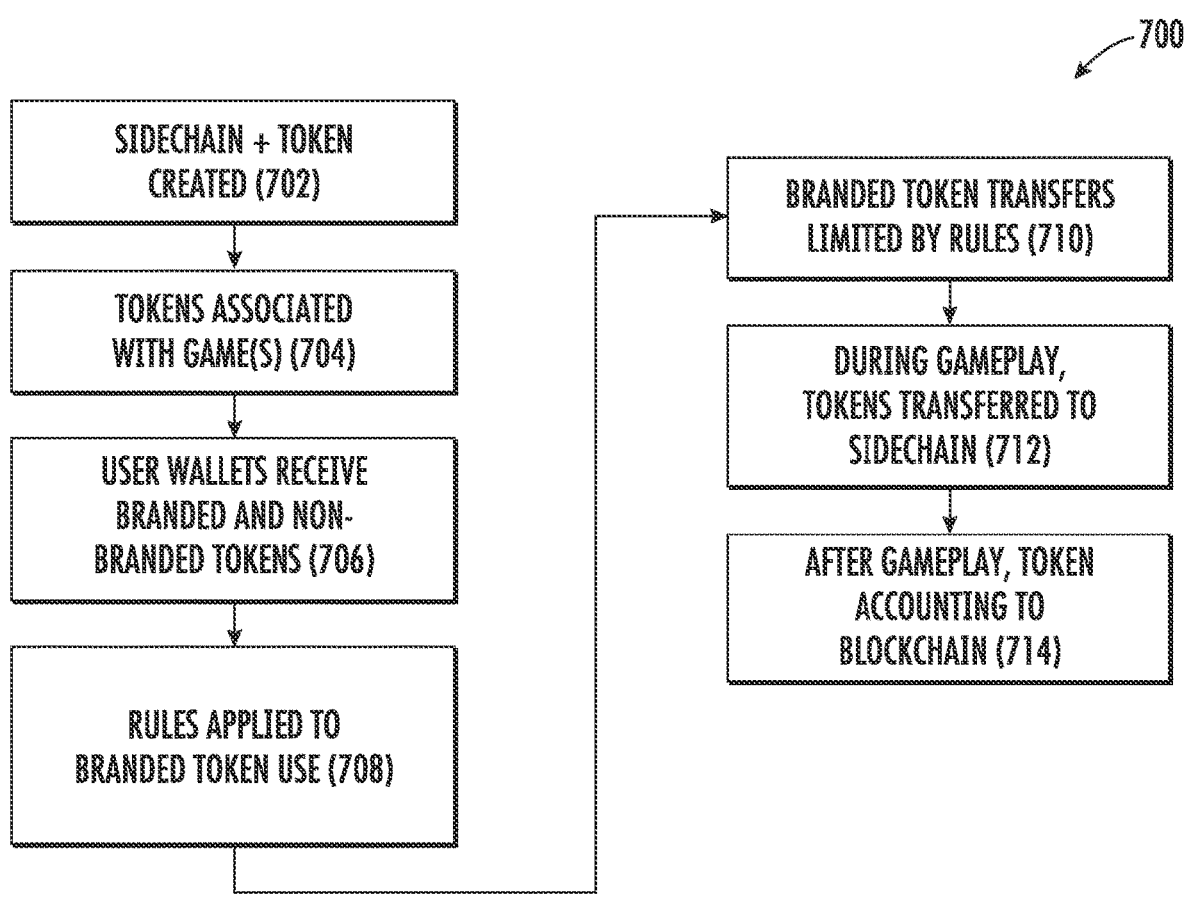
FIG. 7 shows a non-limiting exemplary method for reading information from and writing information to a sidechain.

FIG. 7 shows a non-limiting exemplary method for reading information from and writing information to a sidechain. As shown in the method 700, the sidechain and optionally also the token associated with that sidechain, is created at 702; alternatively, a token may be associated to the sidechain that already exists.

Tokens are then associated with the games of 704. Optionally, the token association may be performed in reverse as token may first be associated with the game. It may then be written to the blockchain or to the sidechain. It may be written to the blockchain first and then later onto the sidechain, or it may be made accessible to the blockchain first and then only later accessible to the sidechain. There is not necessarily a one-to-one correlation between sidechains and tokens. It may be that a sidechain may be able to accept multiple different tokens. And it may also be that one token could be written to multiple sidechains.

At 706, the user wallets receive branded and non-branded tokens. Non-branded tokens may be tokens that are available at a plurality of different games or a plurality of different developers or publishers. Branded tokens may be those that are associated with a particular publisher, developer or game, even a particular character, or which may be only be spendable through frees for that character. Also instead of branded and non-branded, there may be for example, tokens with more rules, tokens with fewer rules, et cetera, more restrictions, fewer restrictions.

The rules are then applied optionally to each token use, but preferably to the restricted token use, in particular 708. The branded token transfers may be limited by the rules at 710 so that only certain tokens may be used in a certain way. Of course, all tokens may have a certain number of rules, but these are referred to an additional set of rules that may be applied to a subset of tokens; or for the same tokens, but to a subset of users.

During gameplay tokens are preferably just transferred to the sidechain of 712 in order to speed up game play and to reduce bottlenecks. After gameplay, the token accounting is performed to the blockchain at 714. However, in some cases for the branded tokens, it is possible that the branded token is not moved to the blockchain, but instead remains on the sidechain. It is also possible for token accounting to be written to the blockchain periodically or at different times only for certain kinds of tokens and also only for certain users.

Figure 8:
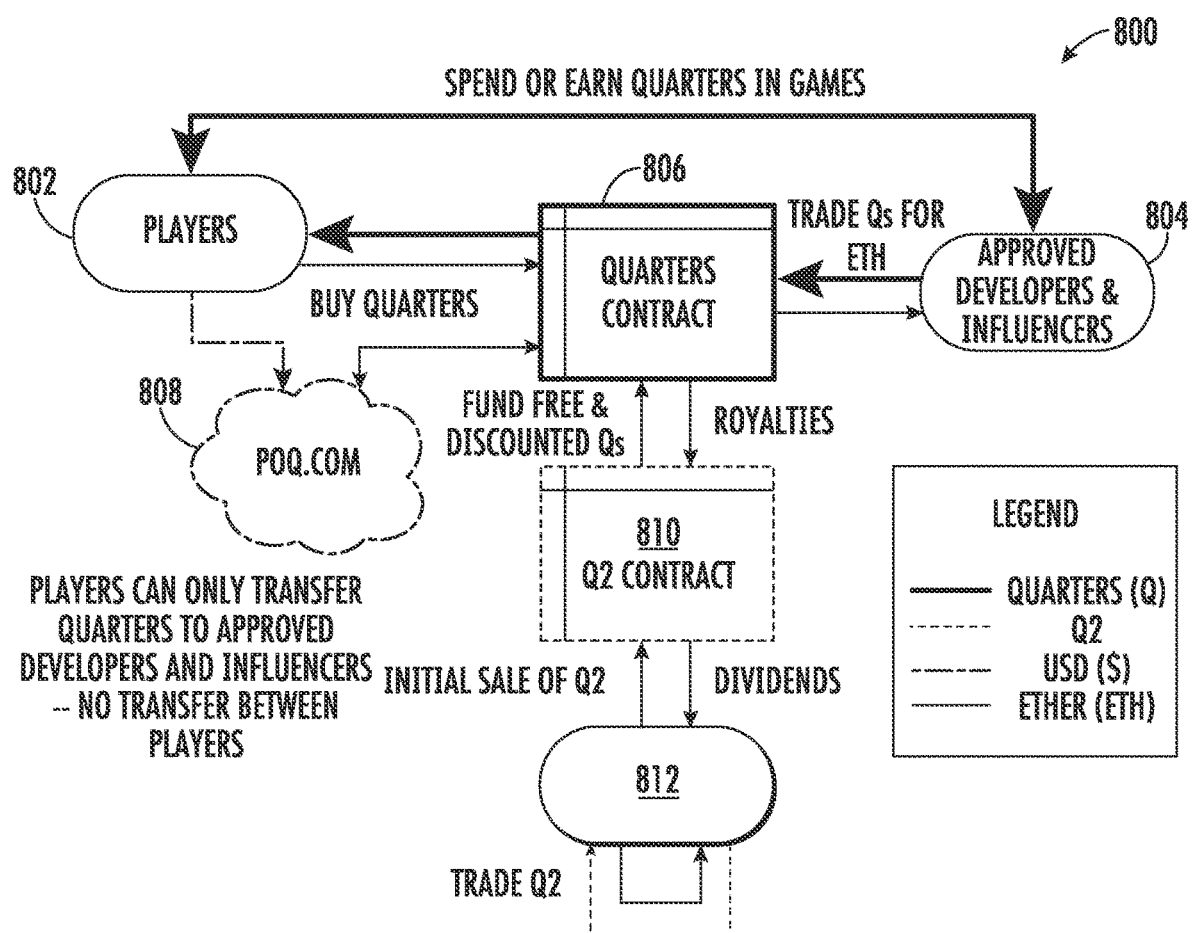
FIG. 8 shows a non-limiting exemplary example of a smart contract, and optionally a plurality of such smart contracts, with use with any of the above systems.

FIG. 8 shows a non-limiting exemplary example of a smart contract, and optionally a plurality of such smart contracts, and the corresponding flow for use with any of the above systems. As shown in a flow process 800, which also combines elements of a system, the players which operate player computational devices are shown at 802. They wish to play games from and also interact with approved developers and influencers at 804.

The players are those performing actions through the player computational devices at 802. At 804, the approved developers and influencers wished to provide content, games, other information to the players. In order for the players to reward the approved developers and influencers, preferably a smart contract shown as a virtual currency (VC) contract at 806 is used to mediate these transactions. Such mediation may include control over spending of tokens by the players, receipt of tokens by the approved developers and influencers and optionally also conversion of the tokens. Such conversions may be restricted so that they are optionally only performed by those who are approved at 804, to, for example, a fiat currency or other cryptocurrencies.

Optionally, both those accounts at 804 and 802 can buy the gameplay tokens, but preferably more restrictions are placed on the player accounts, for those who are designated as players, as opposed to those who are designated as developers or influencers. A server system 808 enables gameplay to occur directly, or alternatively is in communication with one or more servers through which gameplay occurs in order to determine, for example, which game the user wishes to log onto, how they wish gameplay to occur. This server system at 808 may then communicate with the smart contract at 806, in order to determine whether or not the user has access to a certain number of tokens, which tokens are accessible, how these are chosen to spend or receive tokens and forth.

The smart contract at 806 may be configured as an ERC-20 smart contract, with typical extensions "standardtoken", "ownable", and "migrationtarget". Preferably three permission levels are set for entities interacting with the smart contract. An owner may modify earnings tiers for approved accounts which are allowed to have earnings, such as those users (developers and influencers) having accounts at 804. Optionally, the underlying fiat or cryptocurrency, such as ETH, is in escrow. The owner may also be able to set "approved" status for accounts, including with regard to the type of account (player vs accounts with more permissions). Optionally the owner can set bonus tokens (as a fraction of previously purchased tokens). Separate control over these tokens may be given to game publishers and/or to other stakeholders, such as investors, which are paid through the Q2 contract at 810 (described below).

The owner may also be able to perform other contract actions, such as maintaining a cryptocurrency/USD rate to maintain a fixed cost in USD. The owner may also control withdrawal rates for converting the tokens to a fiat currency and/or cryptocurrency. The owner may also be able to migrate data when upgrading the smart contract. The owner may also be able to designate certain accounts as delegated authorities which are at least able to buy tokens on behalf of another user (account), with delegated authority. For example, a game publisher or developer may be provided with such delegated authority, so that they can buy tokens for distribution to users as part of a promotion or for other reasons. Such a delegated authority may also be permitted to sell and/or transfer tokens on behalf of other accounts. The owner account may also be able to transfer ownership of the smart contract.

Approved accounts may have further actions that may be performed through the smart contract at 806, for example including receiving and sending tokens to other accounts, and also exchanging tokens for a cryptocurrency such as ETH and/or a fiat currency. Any other account, which receives a lower level of approval (for example for players), is able to purchase tokens, for example with a cryptocurrency such as ETH and/or a fiat currency; and is preferably also able to send or receive tokens from approved accounts. Preferably however such accounts may not be able to sell tokens for fiat or cryptocurrency, and also may have restrictions on sending or receiving tokens, which may be greater than for accounts with higher levels of approval. These various restrictions may be implemented to for example prevent money laundering, which was found to occur in certain types of online games.

Optionally, a separate smart contract 810 shown as a Q2 contract is used to support those who may be investors or to support cashing out, for example, in case of a tournament, in which case a player would need to be rewarded. Optionally, a separate contract performs this because this may be a one-off alternative, may be continuous, but with separate rules. At 812, transactions are approved between tokens and fiat or cryptocurrency by smart contract 810. Smart contract 810 may also provide for designated authorities with permissions as described above. Investors may be given the following permissions by smart contract 810: add ETH to unclaimed royalties or other payments that are accessible by the investors; sending tokens to another owner; adding a new owner; triggering payment of accrued royalties. The investors preferably receive royalties of a percentage of the tokens, convertible to a cryptocurrency and/or a fiat currency, which are exchanged in transactions. Optionally such royalties are held in escrow, until an action taken triggers the payment. Optionally the tokens used by smart contract 810 for implementation by 812 are different from the tokens used for gameplay as described herein.

Figure 9A:
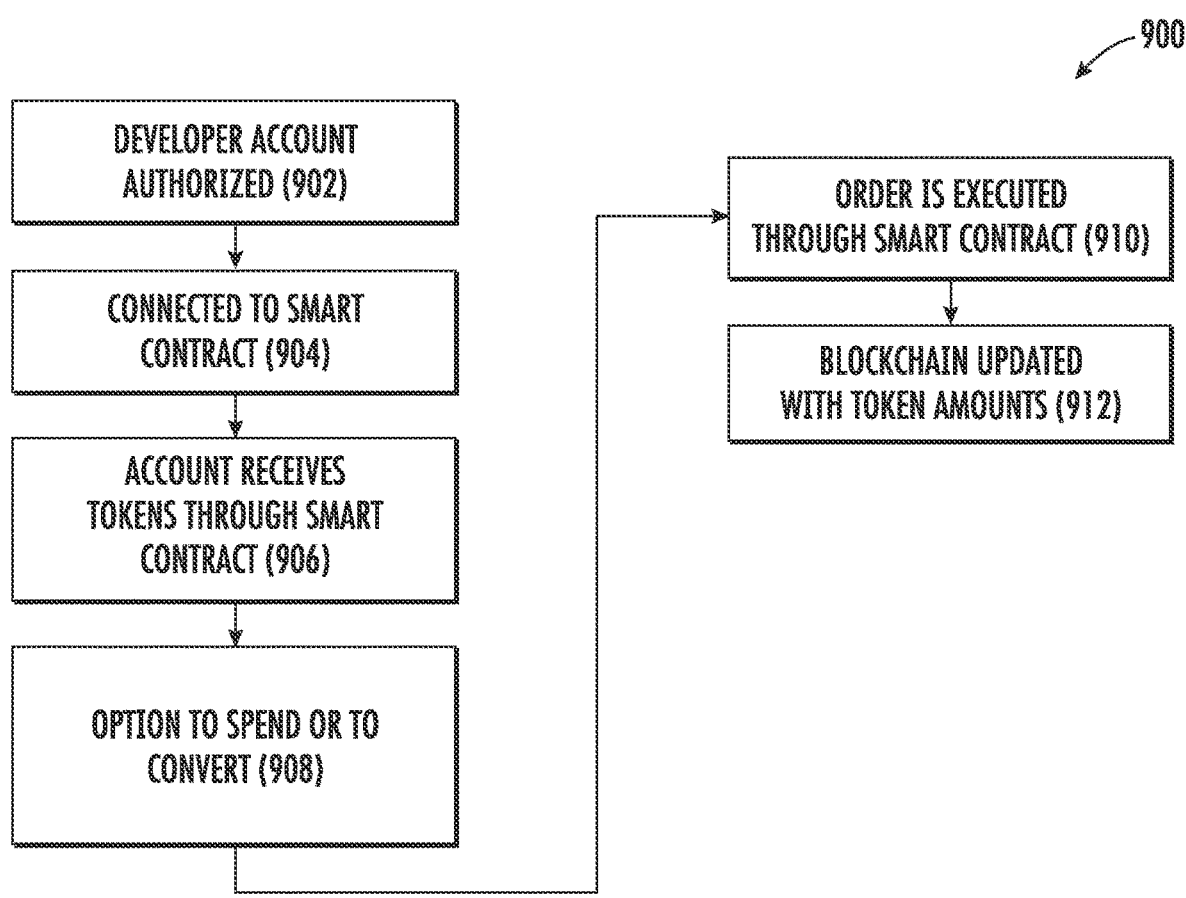
FIGS. 9A and 9B show two non-limiting examples of flows of the smart contract.
Figure 9B:
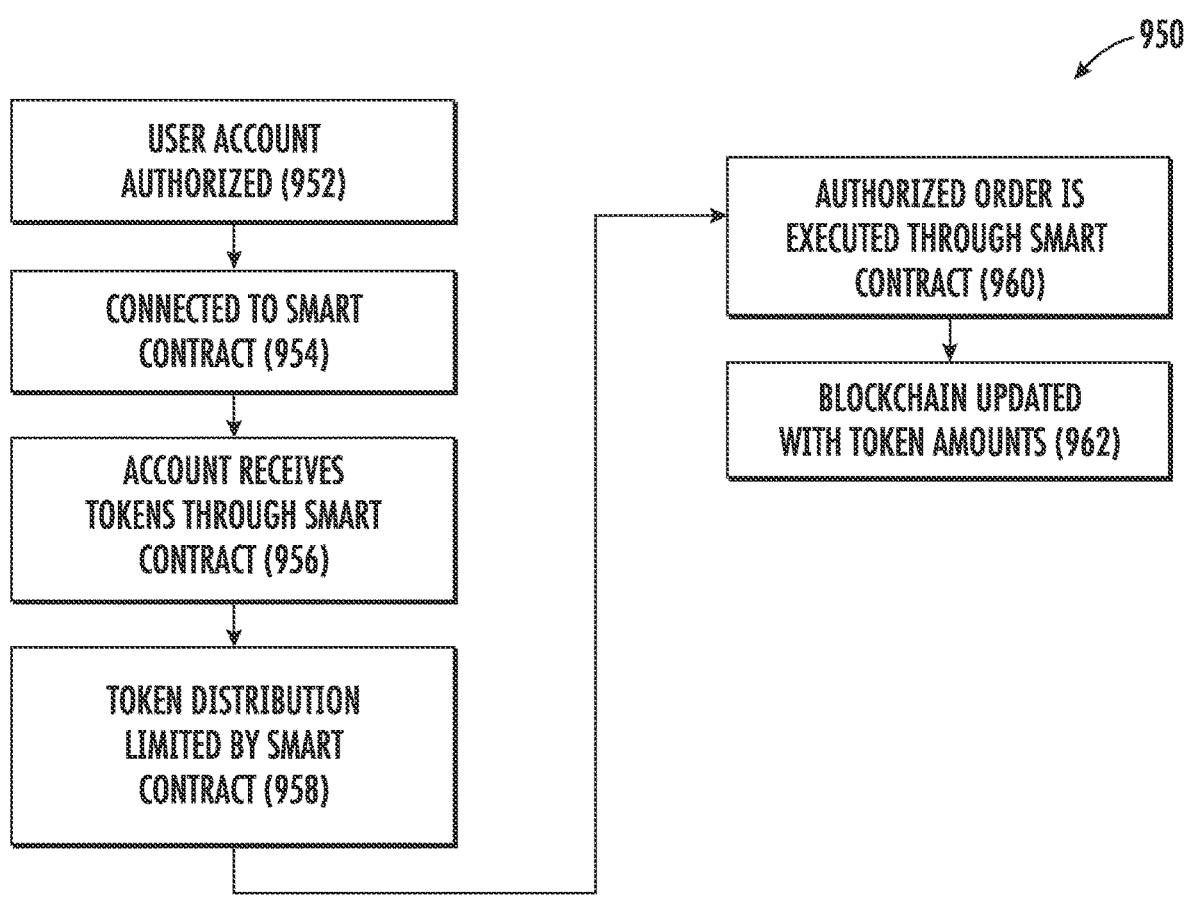

FIGS. 9A and 9B show two non-limiting examples of flows of the smart contract. As shown in FIG. 9A in a flow 900 for a smart contract, starting at 902 a developer account is authorized. This similar flow may also be used for influencers or others who may receive rewards in the form of tokens, which they then have greater freedom to convert to fiat cryptocurrency. The developer account is then connected to the smart contract at 904 and the account receives tokens through the smart contract at 906. For example, from players who wish to play the game, from publishers who wish to reward the developer for joining a particular publishing house or co-op, from advertisers who wish to reward them for incorporating commercially based symbols within a particular game and forth.

The developer account has the option to spend the tokens or to convert them at 908. This may be done through an account or alternatively also through a wallet. For example, if the developer had an associated developer wallet, the developer could choose to use the token from the wallet, for example, to spend on licensing fees. For example, if the developer was licensing a particular engine, such as the unity engine, the developer could choose to pay some sort of fee through that. The developer could also choose to pay co-op fees for joining a co-op through a developer wallet and forth.

In either case whether the developer has chosen to spend or convert these tokens, the order is executed through the smart contract at 910 and then the blockchain is updated token amounts of 912. Owing to the potentially lower speed of interactions with the developer account, the developer account transactions may optionally only be performed with regard to the blockchain, but may alternatively also be performed with regard to the sidechain.

In FIG. 9B, in the second example, shown in a smart contract flow 950. now the user account is authorized at 952, it is connected to the smart contract at 954. Again, the account receives tokens to the smart contract at 956, which is then connected to the wallet as previously described. Optionally, the token distribution is limited by the smart contract in 958, for example with regard to which tokens may enter the user wallet, which tokens may be spent from the user wallet, or if no wallet is being used, which tokens may be spent from or added to the user account; all of this may be controlled by the smart contract.

The user then requests a particular order through the smart contract, which determines whether it's authorized, if authorized and the authorized order's executed through the smart contract at 960 and the blockchain is up here with the token amounts of 962. Optionally, again, through a sidechain as previously described.

Figure 10:
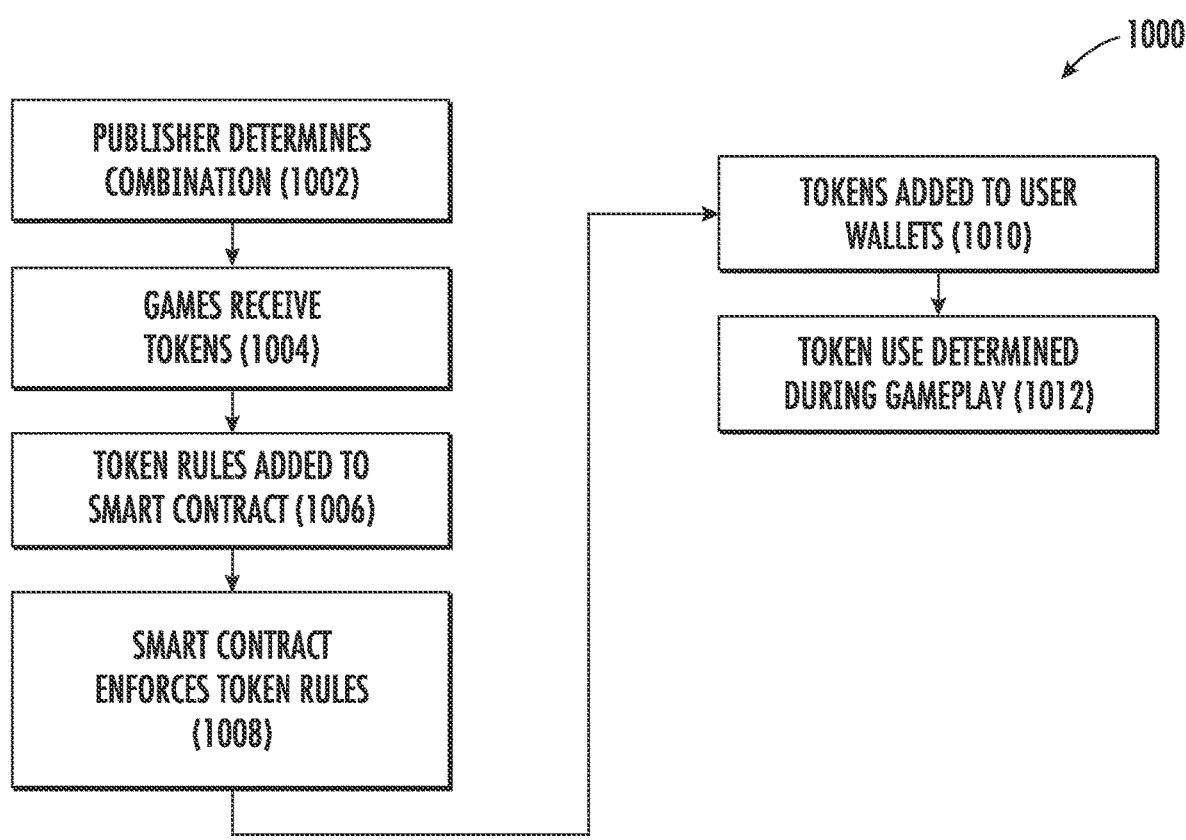
FIG. 10 shows a non-limiting exemplary flow for a micro economy.

FIG. 10 shows a non-limiting exemplary flow for a micro economy. By microeconomy, it has meant a situation in which a plurality of games from a single developer or publisher, a plurality of developers, a plurality publishers combinations of publishers, developers, and games and forth may come together to choose to sell games under one particular hub or through one particular economy; in which token exchange is permitted at least under some circumstances. If game A and game B do not have any token exchange which has permitted, they may still belong to the same microeconomy. But potentially they would not belong to the same macro economy as the microeconomy would be intended for promoting game use and game fungibility through a plurality of the games, publishers, developers and other situations. As shown in a flow 1000, a publisher determines the combination of games they wish to provide, or a combination of developers they wish to provide as part of this co-op or this shared experience at 1002. These games receive tokens at 1004, which may be used across a plurality of these games and potentially other games as well.

Token rules for the games are added to the smart contract at 1006. For example, certain tokens can only be spent at certain games, or certain tokens may have a lower permitted volume in one game and a higher volume in another game and forth. The smart contract enforces the token rules at 1008 during gameplay. Tokens may be added to the user wallet at 1010, particularly if these are new games or new tokens or potentially tokens that may have been used for other games previously, but now are being used for more games. And then the token use may be determined during game play at 1012. Optionally, if a token is added to a user wallet, even if another game later on becomes accessible with those tokens, these are preferably doesn't have to do anything. Instead, the wallet is automatically updated in order to show that this is a possibility. Alternatively, the gameplay servers are updated, or alternatively the server gateway for controlling the blockchain interactions is updated. Other parts of the system may also be updated to provide a seamless experience for the user.

Figure 11:
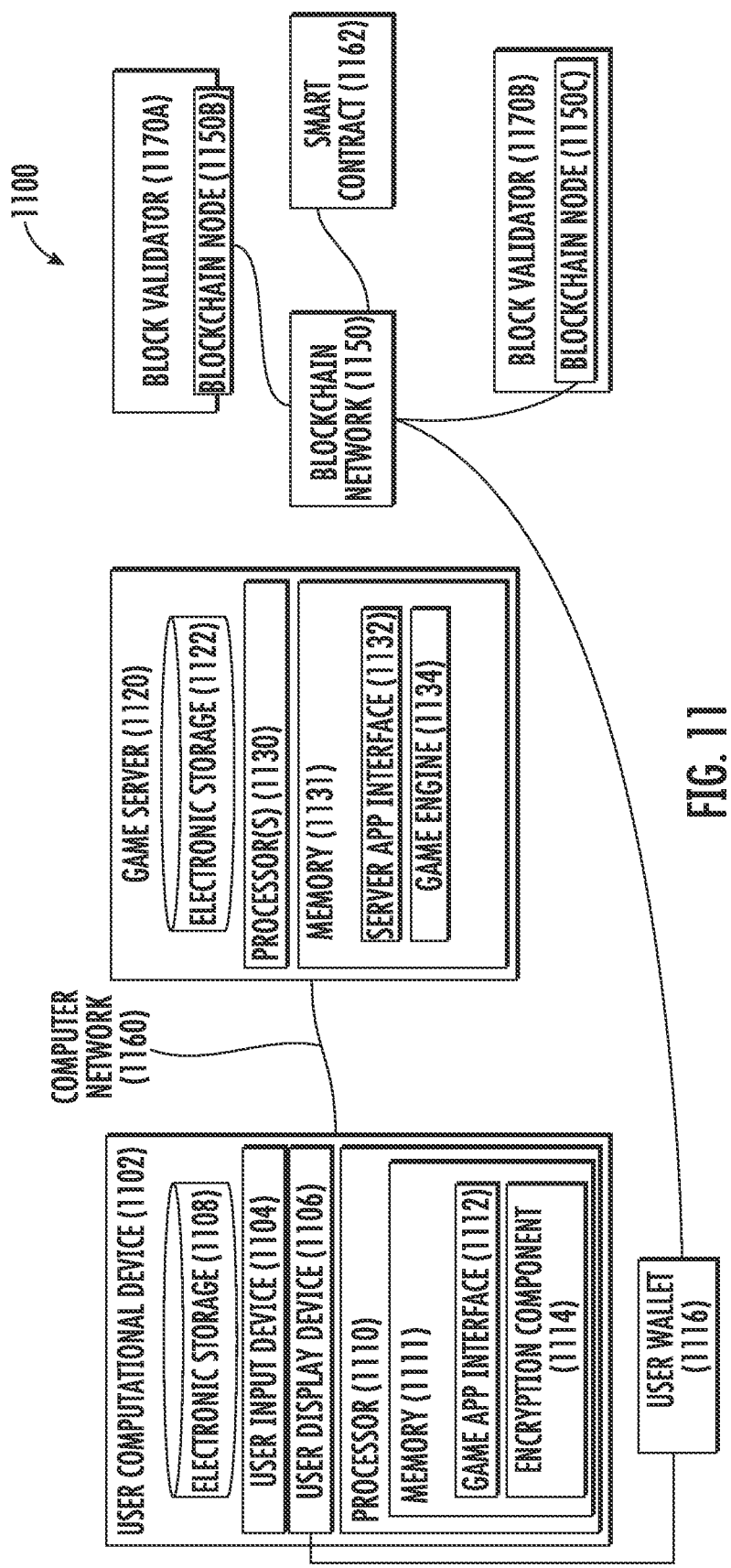
FIG. 11 shows a non-limiting exemplary system for recording game tokens for use with a game engine but outside of a centralized exchange.

FIG. 11 shows a non-limiting exemplary system for recording game tokens for use with a game engine but outside of a centralized exchange. The system may be used with various types of games across multiple game servers or multiple game types. As shown with regard to system 1100, there is provided a user computational device 1102, which communicates through a computer network 1160 with a game server 1120. User computational device 1102 features a game app interface 1112. Game play may optionally occur through interactions between game app interface 1112 and game server 1120, such that a communicative connection is required during game play. Optionally game play occurs mainly or entirely through interactions with game app interface 1112, such that for example game server 1120 may provide only support for game play and/or for token exchange. Alternatively, game server 1120 may comprise a plurality of game servers (not shown).

User computational device 1102 also optionally features an encryption component 1114, which may be used to assist with reading information from already encrypted information to the blockchain, or may otherwise be used to provide an extra layer of security for game app interface 1112. Encryption component 1114 may for example support communication with a user wallet 1116. In this configuration, user wallet 1116 is preferably operated by user computational device 1102 and/or in communication with user computational device 1102. The latter configuration may be implemented for a "cold" or hardware wallet. User wallet 1116 may store a key or key combination (for example, public and private address) for accessing tokens for exchange or alternatively, may store the plurality of tokens, directly or indirectly (for example by storing information required to access the tokens).

User computational device 1102 preferably also includes the user input device 1104, and user display device 1106. The user input device 1104 may optionally be any type of suitable input device including but not limited to a keyboard, microphone, mouse, or other pointing device and the like. Preferably user input device 1104 includes a list, a microphone and a keyboard, mouse, or keyboard mouse combination. User display device 1106 is able to display information to the user for example from game app interface 1112.

User computational device 1102 also comprises electronic storage 1108. Electronic storage 1108 may comprise non-transitory storage media that electronically stores information. The electronic storage media of electronic storage 1108 may include one or both of system storage that is provided integrally (i.e., substantially non-removable) with user computational device 1102 and/or removable storage that is removably connectable to user computational device 1102 via, for example, a port (e.g., a USB port, a firewire port, etc.) or a drive (e.g., a disk drive, etc.). Electronic storage 1108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1108 may include one or more virtual storage resources (e.g., cloud storage, a virtual private network, and/or other virtual storage resources). Electronic storage 1108 may store software algorithms, information determined by processor(s) 1110, information received from server gateway 1120, and/or other information that enables user computational device 1102 to function as described herein.

User computational device 1102 also comprises a processor 1110 and a memory 1111 containing computer readable instructions. Functions of processor 1110 preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 1111 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 1111 is configured for storing a defined native instruction set of codes. Processor 1110 is configured to perform a defined set of basic operations in response to receiving a corresponding basic instruction selected from the defined native instruction set of codes stored in memory 1111. For example and without limitation, memory 1111 may store a first set of machine codes selected from the native instruction set for receiving information from the user, for example with regard to game play, through game app interface 1112 and a second set of machine codes selected from the native instruction set for transmitting such information to game server 1120 to support game play.

However, token exchanges, for example for use in gameplay, preferably do not occur through game server 1120 in this implementation. Instead, user wallet 1116 preferably handles such token exchanges, either directly through a blockchain network 1150 as shown, or indirectly through communication supported by user computational device 1102 to blockchain network 1150. For example, when token exchange is to occur, tokens may be exchanged through interaction(s) between user wallet 1116 and one or more block validators 1170A and 1170B, where each block validators may read from or write to a blockchain node, such as 1150B and 1150C, which is part of blockchain network 1150. To provide control over such token exchanges, they may be governed by a smart contract 1162. Smart contract 1162 may for example be configured as for the example shown in FIG. 8, for example with regard to virtual currency contract 806.

Smart contract 1162 is preferably able to enforce rules regarding proper token exchange, for example as described herein. Token exchanges which do not follow the rules may be reversed. The system as shown herein, with controlled tokens and token transactions, may be used for fraud prevention. Currently for digital games and in particular mobile games, fraud and chargebacks are a costly expense to many games and publishers. Smart contract 1162 may monitor each token transaction performed through user wallet 1116 and reverse fraudulent transactions, and/or remove, reallocate, reward, and return coins purchased or fraudulently obtained for association with user wallet 1116.

User wallet 1116 may, for example, be used to determine the number of tokens a user has before gameplay starts to assist in the spending of, or acquisition of game tokens during game play and otherwise to write information, to read information from blockchain network 1150, which includes a ledger accounting of the available tokens for the user and the state of changes in the availability of such tokens, for example during gameplay. Smart contract 1162 may be required to determine availability of tokens and to provide information or confirmation, which user computational device 1102 may then transmit to game server 1120 to support initiation and/or continuation of game play.

Game server 1120 preferably comprises a processor 1130 and a memory 1131 with machine readable instructions, with related or at least similar functions to the processor and memory described above, including without limitation functions of a server as described herein. For example and without limitation, memory 1131 may store a first set of machine codes selected from the native instruction set for receiving information regarding token exchange instructions from user computational device 1102 via a server app interface 1132, and a second set of machine codes selected from the native instruction set for executing gameplay through a game engine 1134 according to such token exchanges, for example for use in gameplay, which may be performed through communication between user wallet 1116 and blockchain network 1150.

Server gateway 1120 also comprises electronic storage 1122. Electronic storage 1122 may comprise non-transitory storage media that electronically stores information. The electronic storage media of electronic storage 1122 may include one or both of system storage that is provided integrally (i.e., substantially non-removable) with server gateway 1120 and/or removable storage that is removably connectable to server gateway 1120 via, for example, a port (e.g., a USB port, a firewire port, etc.) or a drive (e.g., a disk drive, etc.). Electronic storage 1122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1122 may include one or more virtual storage resources (e.g., cloud storage, a virtual private network, and/or other virtual storage resources). Electronic storage 1122 may store software algorithms, information determined by processor(s) 1130, information received from user computational device 1102, information received from blockchain network 1150, and/or other information that enables server gateway 1120 to function as described herein.

FIG. 12 shows a non-limiting exemplary flow for operating the system of FIG. 11. As shown in a flow 1200, the process begins when the user's account is authorized for game play at 1202. This authorization may be performed as described above. Next, the user's authorized wallet is connected to the smart contract for token distribution authorization at 1204. For example, the wallet may connect with one or more mining pools to facilitate token exchange, if a separate token exchange is not used. However, the smart contract needs to authorize each such exchange and can reverse it if not authorized. At 1206, the wallet receives tokens, for example by having the tokens associated with the public key or public address of the wallet, such that the wallet receives control over these tokens. Game play may then occur at 1208 upon validation of the existence of sufficient authorized tokens, for example according to a validation from the smart contract. If the user wishes to use tokens in game play and/or to receive more tokens, then at 1210 an authorized order is executed through the mining pool(s) with authorization of the smart contract. The blockchain is then updated with the current ownership and token amounts at 1212.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for providing tokens for transactions in a plurality of games through a blockchain, the system comprising a game user computational device for being operated by a game user, said game user computational device comprising a game user interface for interacting with the plurality of games; a server gateway for operating a blockchain interface; and a computational network for connecting said game user computational device and said server gateway; wherein said game user interface is operable across a plurality of different types of gaming platforms or hardware; wherein said game user computational device comprises a memory and a processor, wherein said memory is configured for storing a defined native instruction set of codes and said processor is configured to perform a defined set of basic operations in response to receiving a corresponding basic instruction selected from the defined native instruction set of codes stored in said memory, wherein said memory stores a first set of machine codes selected from the native instruction set for receiving information from the user through said game user interface and a second set of machine codes selected from the native instruction set for transmitting such information to said server gateway for token exchanges for use in gameplay; wherein said game user computational device directs transactions of the tokens during gameplay with each of said plurality of games, and wherein said transactions are performed through said blockchain interface of said server gateway; wherein said system further comprises a plurality of game user computational devices, each game user computational device being associated with a game account for said plurality of games and for transactions of said tokens, wherein said tokens are not exchangeable between said plurality of game accounts.

2. The system of claim 1, further comprising a game server for supporting operation of at least one game, wherein said game user computational device communicates with said game server for gameplay and wherein said game server consumes tokens or credits tokens during gameplay, wherein said server gateway accounts for said tokens consumed or credited through transactions on the blockchain.

3. The system of claim 1, wherein said tokens held in said game account are not exchangeable for fiat or cryptocurrency.

4. The system of claim 1, further comprising a game creator computational device associated with a game creator account, said game creator account receiving a plurality of tokens for game creating activities, wherein said tokens held in said game creator account are exchangeable for fiat, cryptocurrency or a combination thereof.

5. The system of claim 1, wherein said game user interface comprises a plurality of game user interfaces for supporting interactions with the plurality of games.

6. The system of claim 1, wherein said server gateway supports said transactions according to a plurality of rules, such that said direction of transactions by said game user computational device is restricted according to said rules.

7. The system of claim 1, further comprising a sidechain, wherein tokens used during gameplay are temporarily stored on said sidechain, and wherein any remaining tokens are written to the blockchain from said sidechain; and wherein said game server sends a notification of said remaining tokens at the end of gameplay to said server gateway on said sidechain, for recording on the blockchain.

8. The system of claim 1, further comprising a user wallet for storing the tokens and for supporting transactions on the blockchain, wherein said user wallet is in communication with said game user computational device and said server gateway.

9. The system of claim 8, wherein said server gateway tracks activities associated with said user wallet as a pseudonymous identification.

10. The system of claim 9, further comprising a game server for executing the game, wherein said user wallet is in communication with said game server, wherein said game server tracks activities associated with said user wallet as a pseudonymous identification.

11. The system of claim 10, wherein marketing is directed according to said pseudonymous identification.

12. The system of claim 10, wherein said server gateway, said game server or a combination thereof determines that at least one transaction associated with said user wallet is fraudulent.

13. The system of claim 12, wherein said fraudulent activity is reversed.

14. The system of claim 1, wherein the blockchain comprises any suitable blockchain or sidechain operating according to a suitable distributed ledger technology protocol.

15. The system of claim 1, wherein the tokens are not exchangeable outside of the blockchain or sidechain, and wherein said server gateway controls exchange of the tokens within a gaming environment.

16. A system for providing tokens for transactions in a game through a blockchain, the system comprising a game user computational device for being operated by a game user, said game user computational device comprising a game user interface for interacting with the game; a server gateway for operating a blockchain interface; a game server for operating the game, including for determining tokens credited and/or consumed during gameplay by said game user computational device, said game server operating a game account associated with said game user computational device, according to which said game user computational device is permitted to interact with the game; a wallet for storing the plurality of tokens or a key for accessing same; and a computational network for connecting said game user computational device, said game server, said wallet and said server gateway; wherein said wallet is associated with said game account; wherein said game user computational device directs transactions of the tokens during gameplay according to tokens stored in said wallet, and wherein said transactions are performed through said blockchain interface of said server gateway.

17. The system of claim 16, wherein said game server and said server gateway comprise the same server or plurality of servers; and wherein said wallet is operated by said server gateway, said game user computational device, said game server or a combination thereof.

18. A system for providing tokens for transactions in a game through a blockchain, the system comprising a game user computational device for being operated by a game user, said game user computational device comprising a game user interface for interacting with the game; a blockchain interface for supporting transactions through the blockchain with the tokens; a game server for operating the game, including for determining tokens credited and/or consumed during gameplay by said game user computational device, said game server operating a game account associated with said game user computational device, according to which said game user computational device is permitted to interact with the game; and a computational network for connecting said game user computational device, said game server, and said blockchain interface; wherein said game user computational device directs transactions of the tokens during gameplay according to tokens stored in a wallet, and wherein said transactions are performed through said blockchain interface; wherein the game comprises a plurality of games, wherein each of said plurality of games is operated by a game server, whether the same or a different game server, and wherein the tokens are usable in each of said plurality of games.

19. The system of claim 18, wherein said blockchain interface is operated by said game server.

20. The system of claim 18, wherein said blockchain interface is operated by a separate server, other than said game server.

* * * * *

Disclaimer

11,189,131 B1 - George Michael Weiksner; George Bolden Weiksner, both of Riverside, CT (US); Timothy Ryan Tello, Trail Manor, TX (US). SYSTEM AND METHOD FOR BLOCKCHAIN TOKENS FOR GAMING. Patent dated November 30, 2021. Disclaimer filed December 18, 2022, by the assignee, Pocketful of Quarters, Inc.

I hereby disclaim the following complete claims 18-20, of said patent.

*(Official Gazette, May 9, 2023)*